(12) United States Patent
Zhu

(10) Patent No.: US 8,359,070 B1
(45) Date of Patent: *Jan. 22, 2013

(54) DYNAMIC SMART CARD APPLICATION LOADING

(75) Inventor: Kevin Zhu, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 13/542,632

(22) Filed: Jul. 5, 2012

Related U.S. Application Data

(63) Continuation of application No. 11/863,228, filed on Sep. 27, 2007.

(51) Int. Cl.
*H04M 1/00* (2006.01)

(52) U.S. Cl. ......... 455/558; 235/375; 235/380; 235/382

(58) Field of Classification Search .............. 455/558, 455/407, 406, 414.1; 235/492, 380, 375, 235/494, 382, 451, 487, 55.1, 379; 709/218; 713/193, 187, 201, 150, 156; 705/67, 64, 65, 75, 41, 39, 400, 26.1

See application file for complete search history.

(56) References Cited

U.S. PATENT DOCUMENTS

| | | | |
|---|---|---|---|
| 6,824,064 B2 * | 11/2004 | Guthery et al. | 235/492 |
| 2007/0169183 A1 * | 7/2007 | Kipnis et al. | 726/9 |
| 2007/0250599 A1 * | 10/2007 | Takayama et al. | 709/218 |

* cited by examiner

*Primary Examiner* — Edward Urban
*Assistant Examiner* — Golam Sorowar

(57) ABSTRACT

A system is provided for smart card application loading. The system includes a mobile device comprising an electronic wallet and a smart card, with the smart card including resident smart card application. The mobile device authenticates a request to load selected smart card application on the mobile device and provides loading approval. The mobile device saves some information for the resident smart card application, and loads the selected smart card application to the smart card in response to the loading approval.

20 Claims, 5 Drawing Sheets

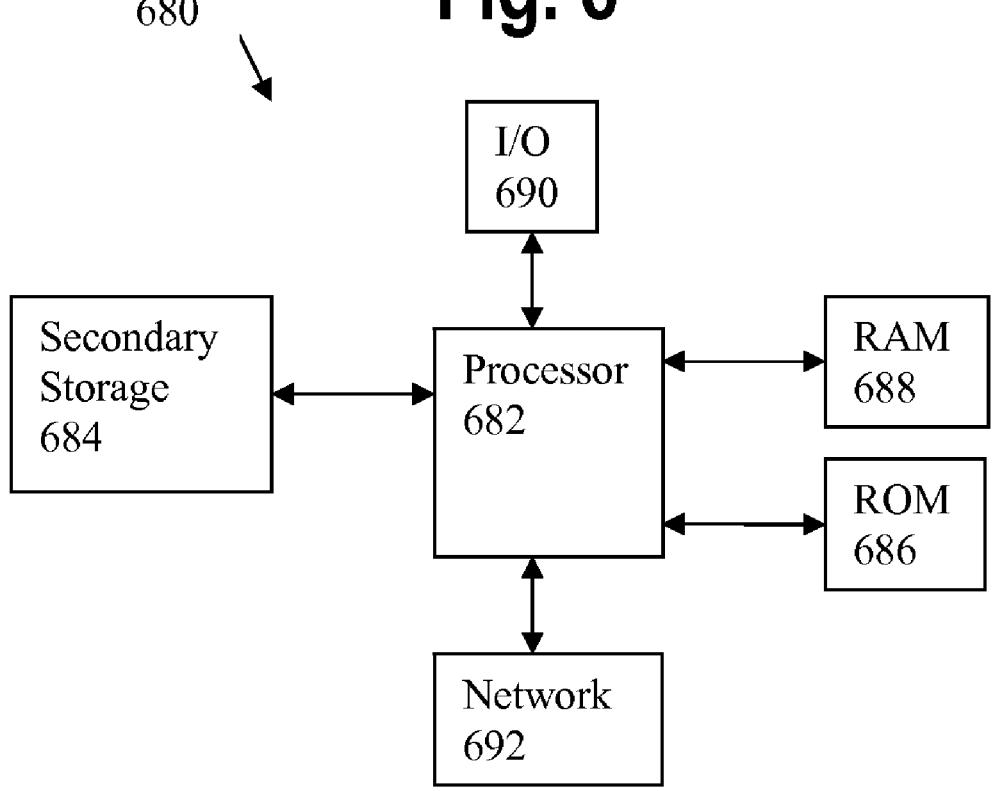

DYNAMIC SMART CARD APPLICATION LOADING

CROSS-REFERENCE TO RELATED APPLICATIONS

This application is a continuation of and claims priority under 35 U.S.C. §120 to U.S. application Ser. No. 11/863,228 filed Sep. 27, 2007, and entitled "Dynamic Smart Card Application Loading," by Kevin Zhu, which is incorporated herein by reference for all purposes. Further, this application includes subject matter related to the following applications, which are hereby incorporated by reference: U.S. patent application Ser. No. 10/901,630, filed Jul. 28, 2004, entitled "Context-Based Card Selection Device," by Kevin Zhu, and U.S. patent application Ser. No. 11/695,344, filed Apr. 2, 2007, entitled "Mobile Device-Based Control of Smart Card Operation," by Kevin Zhu.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Transaction devices are portable items that store data, such as credit cards, debit cards, gift cards, access cards, and cards for various prepaid services or goods. Magnetically encoded transaction devices typically store data in a magnetic strip. A "smart card" is a transaction device that typically contains an embedded microprocessor that offers some degree of computing capacity.

A smart card integrated with a radio frequency component becomes a contact-less smart card, which may communicate with a compatible contact-less card reader without physically contacting the card reader. Communication between a contact-less smart card and various types of contact-less card readers may occur via a radio frequency signal. A contact-less smart card may be a radio frequency identification card, or RFID card. When an RFID card is brought near a contact-less card reader, a radio frequency signal may be exchanged between the RFID card and the contact-less card reader. An RFID card may be used to make automatic payments at, for example, highway tolls, or to provide access to restricted areas. An RFID card in an automobile may be read by a card reader at a toll booth. As the automobile passes through the toll booth, the contact-less card reader may cause a toll to be automatically deducted from a prepaid account or billed to a credit card. When transactions occur between a contact-less smart card and a contact-less reader, the smart card application and associated data may be resident on the contact-less smart card.

A mobile device, such as a mobile phone, may include an integrated contact-less smart card. Thus, if a contact-less card reader is present at a location where commercial transactions occur or where contact-less smart cards are used, the mobile device may make payments, provide access to restricted areas, and perform other functions or transactions typically performed by smart cards if appropriate smart card applications are resident on the integrated contact-less smart card, such as a payment application or an access badge application.

SUMMARY

The present disclosure provides systems and methods for smart card application loading. In some embodiments, the system includes a mobile device that includes an electronic wallet and a smart card, with a smart card application residing on the smart card. The mobile device authenticates a request to load a selected smart card application and provides loading approval. The mobile device saves some information for the resident smart card application, replaces the resident smart card application with a proxy, and loads the selected smart card application to the smart card in response to the loading approval.

In some embodiments, a method is provided for smart card application loading. A request to load selected smart card data is authenticated. Loading approval is provided. The resident smart card data is saved. The selected smart card data is loaded to the smart card.

In some embodiments, the system includes a mobile device and a server. The mobile device includes an electronic wallet and a smart card, with a smart card application residing on the smart card. The server authenticates a request from the mobile device to load a selected smart card application and provides loading approval to the mobile device. The mobile device saves some information for the resident smart card application, replaces the resident smart card application with a proxy, and loads the selected smart card application to the smart card in response to the loading approval.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6 illustrates an exemplary general purpose computer system suitable for implementing the several embodiments of the disclosure.

DETAILED DESCRIPTION

Figure 1:
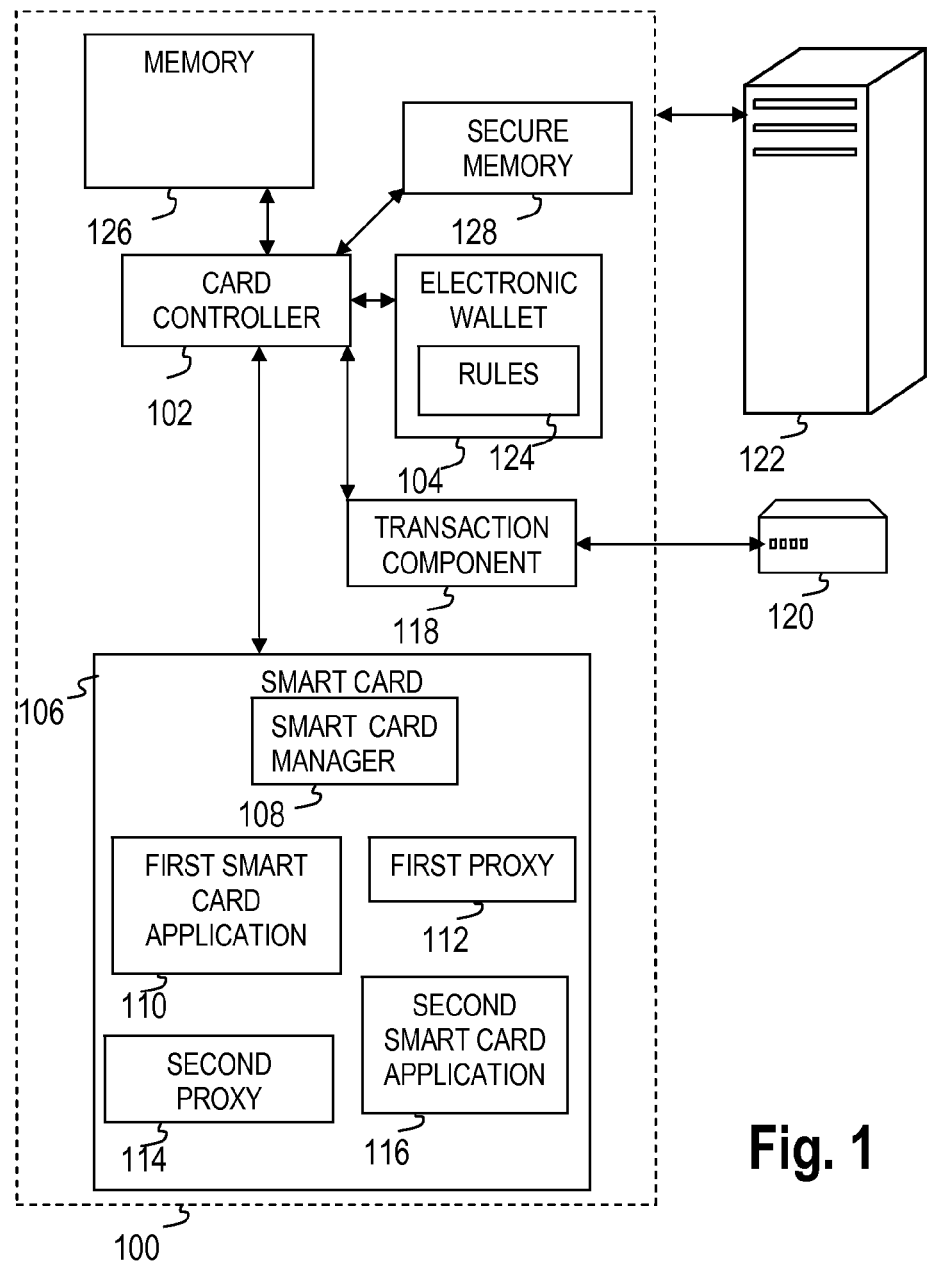
FIG. 1 shows a block diagram of a system for smart card application loading according to some embodiments of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Because a mobile device is a network connected device, a new smart card application may be issued to the smart card resident on the mobile device when the mobile device is communicating over the network. Due to the limited memory of a smart card and/or a smart card integrated into a mobile device, the number of smart card applications and the amount of smart card data that may be stored on the smart card, or in the memory space allocated for a smart card integrated into a mobile device, is limited. However, the mobile device has its own memory that the smart card may be able to access. If a user of the mobile device selects a smart card application for a transaction, and the selected smart card application is not in the smart card's memory, the selected smart card application has to be loaded to the smart card's memory, in some instances to a specifically defined portion of the smart card's memory. The selected smart card application can be loaded from memory elsewhere in the mobile device or from memory outside the mobile device, such as a server in communication with the mobile device. However, the smart card may not have sufficient memory for loading the selected smart card application because the mobile device user may have many more smart card applications than the smart card can store simultaneously, or because only one or a limited number of smart card applications may be stored in the specifically defined space. In this situation, the mobile device user needs a quick and easy way to access more smart card applications than can be stored in the smart card at one time or in the specifically defined location on the smart card.

Loading one of the smart card applications already resident on the smart card to another memory location on the mobile device can provide sufficient memory for the selected smart card application, but can also create a security problem. Such a loading can leave both the proprietary smart card application and any confidential account information in non-secure memory. Consequently, other devices communicating with the mobile device might gain unauthorized access to the proprietary smart card application and the confidential account information.

Furthermore, the deletion of the smart card application may require a complete re-provisioning to load the deleted smart card application back to the smart card if the user wants to use that smart card application again in the future. Re-provisioning is a lengthy process that can require interaction with the provider of the smart card application and deny the user quick access to the deleted smart card application.

Embodiments of the present disclosure provide systems and methods for dynamic smart card application loading. A smart card application may still be loaded to a smart card memory even if the smart card memory does not currently include enough memory for the smart card application. The mobile device can determine how much smart card memory is required for the smart card application and provide the required smart card memory for the smart card application by removing a resident smart card application. The mobile device includes an electronic wallet and a smart card, with a resident smart card application on the smart card. Either the mobile device or a server has access to a digital certificate to determine whether any request to load a selected smart card application may be approved. If the request is approved, either the mobile device or the server can provide loading approval. Based on this loading approval, the mobile device can encrypt and save confidential account information for the resident smart card application. Encrypting confidential account information reduces the possibility of unauthorized access to the information. The mobile device may also replace the resident smart card application with a proxy that can facilitate re-loading the previously-resident smart card application in the future. The proxy is a small placeholder for the resident smart card application. Replacing the previously resident smart card application with the proxy provides sufficient memory to load the selected smart card application due to the difference in memory required for the proxy and for the previously-resident smart card application. The mobile device responds to the loading approval by loading the selected smart card application to portions of the smart card where the resident smart card application may have previously resided. In some embodiments, selected smart card data, instead of a smart card application, replaces resident smart card data at a specific location in smart card memory, such as specific smart card memory reserved for transit card data. Replacing the resident smart card data with smart card data selected for a geographic location enables the smart card to function as a transit card for the geographic location.

FIG. 1 shows a block diagram of a system for smart card application loading according to an embodiment of the present disclosure. The mobile device 100 contains a card controller 102, an electronic wallet 104 and a smart card 106. The card controller 102 is a component that may be implemented as a hardware, firmware, or software device driver. Device drivers often form part of the lowest level of the operating system with which they are linked. Some systems have loadable device drivers which can be installed from files after the operating system is running. The card controller 102 may enable the electronic wallet 104 to communicate with a smart card manager 108 on the smart card 106. The card controller 102 is responsible for accessing the hardware registers of the smart card manager 108 and often includes an interrupt handler to service interrupts generated by the smart card manager 108. The electronic wallet 104 is an application that, in addition to providing a user with information regarding his financial accounts, may enable the user to access and select smart card applications on the smart card 106. The electronic wallet 104 may obtain user input from keys, a keypad or a liquid crystal display (LCD) with a touch sensitive surface through a touch screen/LCD controller, and may present output to a mobile device user through a display.

The smart card 106 may contain a first smart card application 110, a first proxy 112, a second proxy 114, a second smart card application 116, and the transaction component 118. The first proxy 112 may retain a unique application identifier for a previously resident smart card application, wherein the first proxy 112 enables the reloading of the previously resident smart card application back to the smart card 106. The electronic wallet 104 may use the unique application identifier provided by the first proxy 112 to provide the user with a list of smart card applications that are currently loaded on the smart card 106 or may be loaded to the smart card 106. Additionally, when the user requests to use the previously resident smart card application, the first proxy 112 may be capable of initiating the loading of the previously resident smart card application. While two smart card applications and two proxies are shown in FIG. 1, other numbers are also contemplated. The smart card manager 108 may load smart card applications to the smart card 106 for a transaction. The transaction component 118 can enable the smart card 106 to communicate with a vendor device by wireless, such as infrared, optic or radio communication, wired, magnetic "contact reader," or other known or hereafter developed technologies. The vendor device may be point of sale, security, or any other vendor transaction devices, such as a card reader 120. The security for the smart card 106 may be enabled by hardware or software components on the mobile device 100, as part of the smart card 106, or combinations of both.

The ISO/IEC 7816 and ISO/IEC 7810 series of standards for contact smart cards define: the physical shape, the positions and shapes of the electrical connectors, the electrical characteristics, the communications protocols, the format of the commands sent to the card and the responses returned by the card, the robustness of the card, and the functionality. The standard for contact-less smart card communications is ISO/IEC 14443, dated 2001. An alternative standard for contact-less smart cards is ISO 15693, which allows communications at distances up to 50 cm. These standards are illustrative examples only, as embodiments of this disclosure are not limited to these standards.

An application provider server 122 may provide information, such as a digital certificate, needed by the electronic wallet 104 to access and select smart card applications on the smart card 106. The electronic wallet 104 contains or has access to a set of context-based rules 124. While the rules 124 are shown in FIG. 1 as part of the electronic wallet 104, the rules may also reside elsewhere, such as on the application provider server 122. The electronic wallet 104 may process the rules 124 and context information to determine which smart card application is appropriate for a transaction.

The mobile device 100 may select the appropriate smart card application to be employed in a particular situation based on the rules 124 for the context of the situation, wherein the context may be a set of interrelated conditions or circumstances that may apply to the situation. For a commercial transaction, the context may include, but is not limited to, the location of the mobile device 100 at the time of the transaction, the commercial establishment where the transaction may occur, the item that may be purchased, the amount of the purchase, the balance on the smart card application that may be used for the purchase, the credit limit on the smart card application that may be used for the purchase, electronic coupons that may be applicable to the purchase, reward programs that may be applicable to the purchase, the smart card's applications that may be accepted at the place of purchase, and the most recently used smart card application.

One of skill in the art will recognize that numerous other context-based rules are possible. In addition, multiple rules may be combined into more complex rules that depend on a multi-step logical process to select the smart card applications, electronic coupons, reward programs, and other options that are most appropriate for a context. For purposes of brevity of this disclosure, the vast number of context-based rules and combinations of rules that may be employed will not be discussed herein, but will readily suggest themselves to one skilled in the art. U.S. patent application Ser. No. 10/901,630, filed Jul. 28, 2004, entitled "Context-based Card Selection Device" by Kevin Zhu is hereby incorporated by reference for all purposes, and offers many examples of context-based rules for selecting smart card applications.

The mobile device 100 may load some information for a smart card application resident on the smart card 106 to another memory location on the mobile device 100, such as a memory 126 or a secure memory 128. The secure memory 128 may be at a location specified for transit card. For example, the mobile device 100 may select specific smart card data from a smart card application resident on the smart card 106, and load the specific smart card data into the secure memory 128, which is located at a specific memory location for transit cards in the smart card 106. When the smart card 106 functions as a local transit card, the card reader 120 expects the specific smart card data to be located in the secure memory 128. In contrast, if the mobile device 100 loads some information for a smart card application in the memory 126, which is commonly accessible mobile device memory that is not secure, other devices communicating with the mobile device 100 might gain unauthorized access to the information for the smart card application.

Figure 2:
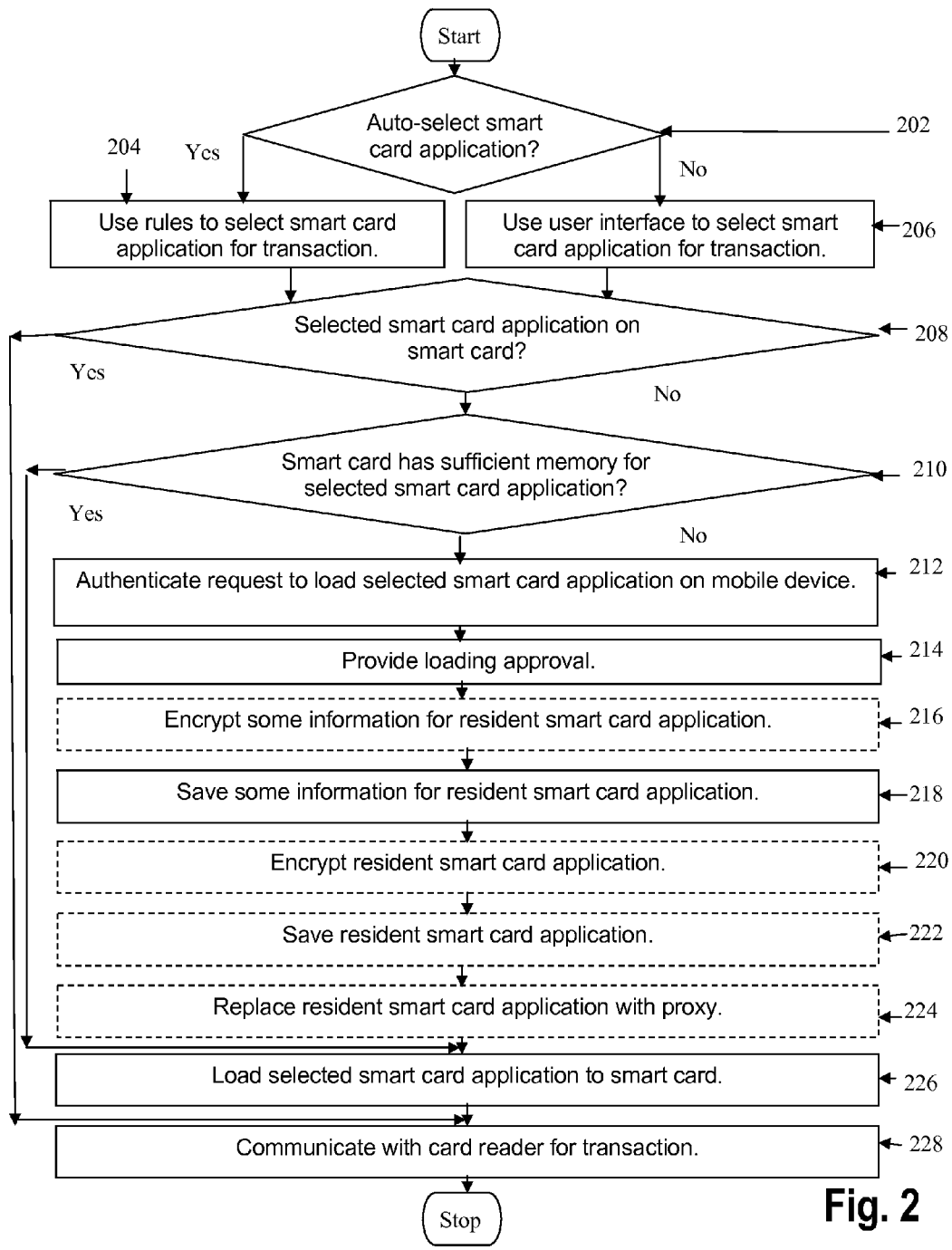
FIG. 2 shows a flowchart of a method for smart card application loading according to some embodiments of the present disclosure.

FIG. 2 is a flowchart illustrating an embodiment of a method for smart card application loading according to an embodiment of the present disclosure. A mobile device user may use the method to make a purchase at a commercial establishment using a smart card application. If a smart card application selected for a transaction is not on the smart card already and the smart card has sufficient memory for the selected smart card application, the mobile device 100 loads the selected smart card application to the smart card. If the smart card does not have sufficient memory for the selected smart card application, the mobile device 100 loads the selected smart card application in place of a smart card application already residing on the smart card. In both situations, the selected smart card application appears to the user as if it was already resident on the smart card.

Because of security reasons, in some embodiments neither the electronic wallet 104 nor the mobile device 100 keeps loading enabling information. When the mobile device 100 keeps the loading enabling information, other devices communicating with the mobile device 100 might gain unauthorized access to this confidential information. Therefore, the electronic wallet 104 may use an application program interface (API) to request the loading enabling information, such as a digital certificate, from the application provider server 122. The application program interface can authenticate an identifying digital certificate from the electronic wallet 104 that uniquely identifies the electronic wallet 104 before requesting loading enabling information from the application provider server 122. The application program interface can use alternative authentication approaches that are more robust and offer protection equal to or better than a digital certificate, approaches such as identifiers on the mobile device 100, a location of the mobile device 100, and a password entered through keys or a keypad on the mobile device 100.

In box 202, the electronic wallet determines whether to auto-select the smart card application. For example, the electronic wallet 104 may use the rules 124 and any context information to determine that the electronic wallet 104 may automatically select a smart card application for a transaction. The electronic wallet 104 may retrieve the rules either internally or from the application provider server 122. In another example, the electronic wallet 104 may use the rules 124 and any context information to determine that the electronic wallet 104 may provide the mobile device user the option of selecting a smart card application through a user interface. If the electronic wallet 104 determines to auto-select the smart card application, the method continues to box 204. If the electronic wallet 104 determines not to auto-select the smart card application, the method proceeds to box 206.

In box 204, the electronic wallet may use the rules and any context information to select at least one smart card application for a transaction. For example, the electronic wallet 104 may use the rules 124 and any context information received from the card reader 122 to determine a category of smart card application to use for the purchase and then select a specific smart card application within the determined category. The electronic wallet 104 conveys this selection through the card controller 102 to the smart card manager 108. In another example, the electronic wallet 104 may use the rules 124 and any context information received from a global positioning system (GPS) sensor to determine a local transit card to use for the purchase. The electronic wallet 104 may select specific smart card data that can be loaded into a specific memory location for transit cards in the smart card 106 to enable the smart card 106 to function as the local transit card. Then the method proceeds to box 208.

In box 206, the mobile device user can use a user interface to select at least one smart card application for the transaction. For example, if the rules 124 indicate that the mobile device user is to select a smart card application, the electronic wallet 104 may choose smart card applications to present to the mobile device user. Then the electronic wallet 104 prompts the mobile device user to select one of the chosen smart card applications for the transaction via a list of smart card applications presented by a user interface, such as a display. Next, the mobile device user selects one of the chosen smart card applications to be used. Subsequently, the electronic wallet 104 conveys this selection through the card controller 102 to the smart card manager 108.

In box 208, the mobile device 100 determines whether the selected smart card application is on the smart card. For example, the mobile device 100 determines whether the first smart card application 110, selected based on the rules 124 and context information from the card reader 120, is on the smart card 106. If the mobile device 100 determines that the selected smart card application is on the smart card 106, the method proceeds to box 228 to communicate with the card reader 120 for the transaction. If the mobile device 100 determines that the selected smart card application is not on the smart card 106, the method continues to box 210 to determine whether the smart card 106 has sufficient memory for the non-resident smart card application that was selected. Alternatively, the mobile device 100 may determine whether the selected smart card data is on the smart card 106. For example, the mobile device 100 determines whether the selected smart card data, selected based on the rules 124 and context information from the GPS sensor, is on the smart card 106. If the mobile device 100 determines that the selected smart card data is on the smart card 106, the method proceeds to box 228 to communicate with the card reader 120 for the transaction. If the mobile device 100 determines that the selected smart card application is not on the smart card 106, the method continues to box 210 to determine whether the smart card 106 has sufficient memory in the specific memory location for transit cards for the non-resident smart card data that was selected.

In box 210, the mobile device 100 determines whether the smart card has sufficient memory for the selected smart card application. For example, the mobile device 100 determines whether the smart card 106 has sufficient memory for the selected smart card application, which may be a third smart card application resident on the application provider server 122 or in the memory 126. If the mobile device 100 determines that the smart card has sufficient memory for the selected smart card application, the method proceeds to box 226 to load the selected smart card application to the smart card. If the mobile device 100 determines that the smart card does not have sufficient memory for the selected smart card application, the method continues to box 212 to request to load the selected non-resident smart card application. Alternatively, the mobile device 100 determines whether the smart card 106 has sufficient memory in the specific memory location for transit cards for the selected smart card data. For example, the mobile device 100 determines whether the smart card 106 has sufficient memory in the specific memory location for transit cards for the selected smart card data, which may be for a local transit card. If the mobile device 100 determines that the smart card has sufficient memory in the specific memory location for transit cards for the selected smart card data, the method proceeds to box 226 to load the selected smart card data to the specific memory location for transit cards. If the mobile device 100 determines that the smart card does not have sufficient memory in the specific memory location for transit cards for the selected smart card data, the method continues to box 212 to request to load the selected non-resident smart card data.

In box 212, the request to load the selected smart card application is authenticated. For example, the electronic wallet 104 requests to load the selected smart card application and the card controller 102 uses a digital certificate resident in the mobile device 100 to authenticate the request. The card controller 102 may use the digital certificate to authenticate that the mobile device 100 is authorized to load the selected smart card application. The selected non-resident smart card application can reside in the memory 126 on the mobile device 100, on the application provider server 122, or any combination thereof. In another example, the mobile device 100 requests to load the selected smart card application and the application provider server 122 uses a digital certificate sent with the request to authenticate the request, communicated through a cell tower and a wired network, from the electronic wallet 104 in the mobile device 100. The application provider server 122 may use the digital certificate to authenticate that the request to load the selected smart card application originated from the mobile device 100 and that the mobile device 100 is authorized to load the selected smart card application. The application provider server 122 may interact with a communication server, not shown, to authenticate the request to load the selected smart card application. In yet another example, the electronic wallet 104 requests to load the selected smart card data, and the card controller 102 uses a digital certificate resident in the mobile device 100 to authenticate the request. The card controller 102 may use the digital certificate to authenticate that the mobile device 100 is authorized to load the selected smart card data.

In box 214, the loading approval is provided to the mobile device 100. For example, the card controller 102 provides loading approval to the mobile device 100 to load the selected smart card application. The selected smart card application may be resident in the memory 126 on the mobile device 100, but not resident on the smart card 106. In another example, the application provider server 122 provides loading approval to the mobile device 100 to load the selected smart card application. The application provider server 122 can provide the selected smart card application to the mobile device 100. For example, the application provider server 122 may communicate the selected smart card application through a cell tower and a wired network to the electronic wallet 104 in the mobile device 100. In yet another example, the card controller 102 provides loading approval to the mobile device 100 to load the selected smart card data. The selected smart card data may be resident in the memory 126 on the mobile device 100, but not resident in the specific memory location for transit cards on the smart card 106.

In box 216, the mobile 100 device optionally encrypts some information for the resident smart card application. For example, the mobile device 100 responds to the loading approval by encrypting confidential account information for the smart card application 110. In another example, the mobile device 100 responds to the loading approval by encrypting resident smart card data.

In box 218, the mobile device 100 saves some information for the resident smart card application. A digital certificate, either resident on the mobile device 100 or received from the application provider server 122, specifies what information the mobile device 100 may save to the memory 126, to the application provider server 122, or to both the memory 126 and the application provider server 122. The mobile device 100 may save a resident smart card application, confidential account information for the resident smart card application, or both the resident smart card application and the confidential account information for the resident smart card application. Alternatively, the mobile device 100 may save resident smart card data. For example, the mobile device 100 saves the encrypted confidential account information for the first smart card application 110 to the memory 126. If the mobile device 100 cannot save the encrypted confidential account information for the first smart card application 110, the mobile device 100 may leave the encrypted confidential account information in the smart card 106, and save the first smart card application 110 instead.

The mobile device 100 can use a digital certificate to promote saving information for the resident smart card application. For example, the card controller 102 may respond with a loading approval to the request to load the selected smart card application, where the loading approval includes a digital certificate that enables saving the resident smart card application. The digital certificate that enables saving can include another digital certificate, a token, or other information required to access the smart card for the information that is encrypted and saved for the resident smart card application. In another example, the application provider server 122 may respond with a loading approval to the request to load the selected smart card application, where the loading approval includes a digital certificate that enables saving the resident smart card application. In yet another example, the card controller 102 may respond with a loading approval to the request to load the selected smart card data, where the loading approval includes a digital certificate that enables saving the resident smart card data.

In box 220, the mobile device 100 optionally encrypts the resident smart card application. For example, the mobile device 100 encrypts the first smart card application 110 because the provider of the first smart card application 110 requires secure protection for the proprietary software in the first smart card application 110.

In box 222, the mobile device 100 optionally saves the resident smart card application. For example, the mobile device 100 saves the encrypted first smart card application 110 to either the memory 126 on the mobile device 100, the application provider server 122, or a combination thereof.

In box 224, the mobile device 100 optionally replaces the resident smart card application with a proxy. For example, the mobile device 100 replaces a previously resident smart card application with the first proxy 112. The proxy can promote loading the previously resident smart card application back to the smart card 106 by loading a small-sized application at the same memory location where the previously resident smart card application was loaded. This proxy retains the same application identifier that was used by the previously resident smart card application, thereby preventing this application identifier from being reassigned to another smart card application subsequently loaded to the smart card 106. By preserving the application identifier for the previously resident smart card application, the proxy enables the previously resident smart card application to be loaded back to its previous memory location and function with the same memory addresses with which it was initially provisioned. The complete re-provisioning process is not required for a previously resident smart card application loaded back to its original memory location on the smart card 106. The mobile device 100 can use a digital certificate to promote replacing the first smart card application 110 with a proxy. For example, the loading approval provided by the application provider server 122 can include a digital certificate, a token, or other information required to access the smart card to replace the resident smart card application with the proxy.

In box 226, the mobile device 100 loads the selected smart card application to the smart card. For example, the mobile device 100 loads the selected smart card application from the memory 126 or from the application provider server 122 to the smart card 106. The mobile device 100 can use a digital certificate to promote loading the selected smart card application to the smart card 106. For example, the loading approval provided by the application provider server 122 can include a digital certificate, a token, or other information required to access the smart card 106 to load the selected smart card application to the smart card 106.

The selected smart card application loaded to the smart card 106 can be a smart card application that previously resided on the smart card 106 and was previously replaced by a proxy, such as the second proxy 114. In this situation, the second proxy 114 retains the same application identifier that was previously used by the selected smart card application, thereby enabling the selected smart card application to be re-loaded to use the previous application identifier. Alternatively, the selected smart card application loaded to the smart card 106 can be a smart card application that did not previously reside on the smart card 106, such that the selected smart card application is not associated with any proxy.

In another example, the mobile device 100 loads the selected smart card data from the memory 126 or from the application provider server 122 to the smart card 106. The mobile device 100 can use a digital certificate to promote loading the selected smart card data to the specific memory location for transit cards on the smart card 106. For example, the loading approval provided by the card controller 102 can include a digital certificate, a token, or other information required to access the smart card 106 to load the selected smart card data to the specific memory location for transit cards on the smart card 106.

In box 228, the selected smart card application communicates with the card reader 120 for the transaction. For example, the electronic wallet 104 may use the selection of a smart card application to signal the smart card manager 108 through the card controller 102 to use the selected smart card application to send payment information to the vendor device, such as the card reader 120, sent via either a contact communication or a contact-less communication. The mobile device 100 may prompt the mobile device user for confirmation or password entry before the smart card application sends the appropriate information to the card reader 120. Then the selected smart card application may send the appropriate information to the card reader 120. The card reader 120 may then process the information appropriately, for example by deducting a payment from a credit account.

In an example of the mobile device 100 being used in the manner of a RFID card, the mobile device 100 may be brought into the proximity of the card reader 120. The card reader 120 may emit a radio frequency signal that may be received by the transaction component 118. Then the transaction component 118 may communicate with the smart card manager 108, which may consult the electronic wallet 104 through the card controller 102. Applying the method described above, the electronic wallet 104 may access the selected smart card data for the card reader 120. Next, the selected smart card data may be loaded to the smart card, if necessary, and send information to the card reader 120. Subsequently, the card reader 120 may process the information appropriately, for example by opening a gate or by deducting a toll from an account. In this example, the card reader 120 includes a smart card application for transactions with local transit cards, and the smart card 106 functions as a local transit card by providing the selected smart card data to the card reader 120.

Figure 3:
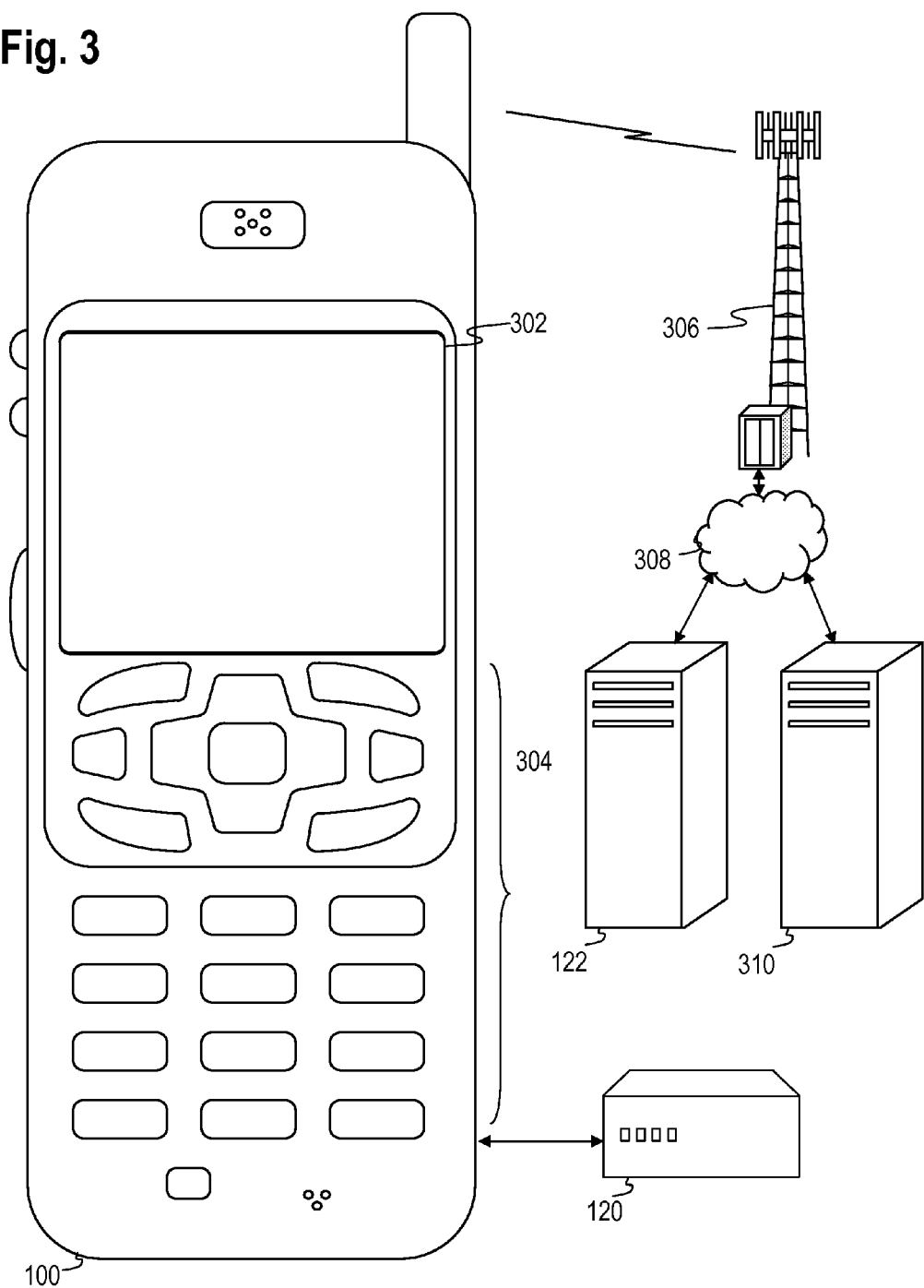
FIG. 3 shows an illustrative wireless communications system.

FIG. 3 shows a wireless communications system which provides the context for the systems and methods of the present disclosure. The wireless communication system includes the mobile device 100. Though illustrated as a mobile phone, the mobile device 100 may take various forms including a personal digital assistant (PDA), a mobile computer, a digital camera, a digital music player, and an electronic key fob for keyless entry. Many suitable mobile devices combine some or all of these functions.

The mobile device 100 includes a display 302 and a touch-sensitive surface or keys 304 with which to interact with a user. The mobile device 100 may present options for the user to select, controls for the user to actuate, and/or cursors or other indicators for the user to direct. The mobile device 100 may further accept data entry from the user, including numbers to dial or various parameter values for configuring the operation of the mobile device 100. The mobile device 100 may further execute one or more software or firmware applications in response to user commands. These applications may configure the mobile device 100 to perform various customized functions in response to user interaction, such as the selection of a smart card application.

The mobile device 100 may communicate through a cell tower 306 and a wired network 308 to access information on various servers, such as a server 310. The server 310 may interact with the application provider server 122 through the wired network 308. While one application provider server 122 is shown in FIG. 3, other servers could be present. The server 310 may act as a gateway to application provider server 122, which may include information needed by an electronic wallet to access, select, and load smart card applications for a smart card. The application provider server 122 may interact with the server 310, which may communicate with the mobile device 100 through the wired network 308 and the cell tower 306 by a standard wireless telephony protocol (such as code division multiple access), a wireless internet connection, or some other means of wireless communication. The mobile device 100 may also communicate through the card reader 120 for a transaction via either a contact communication or a contact-less communication.

Figure 4:
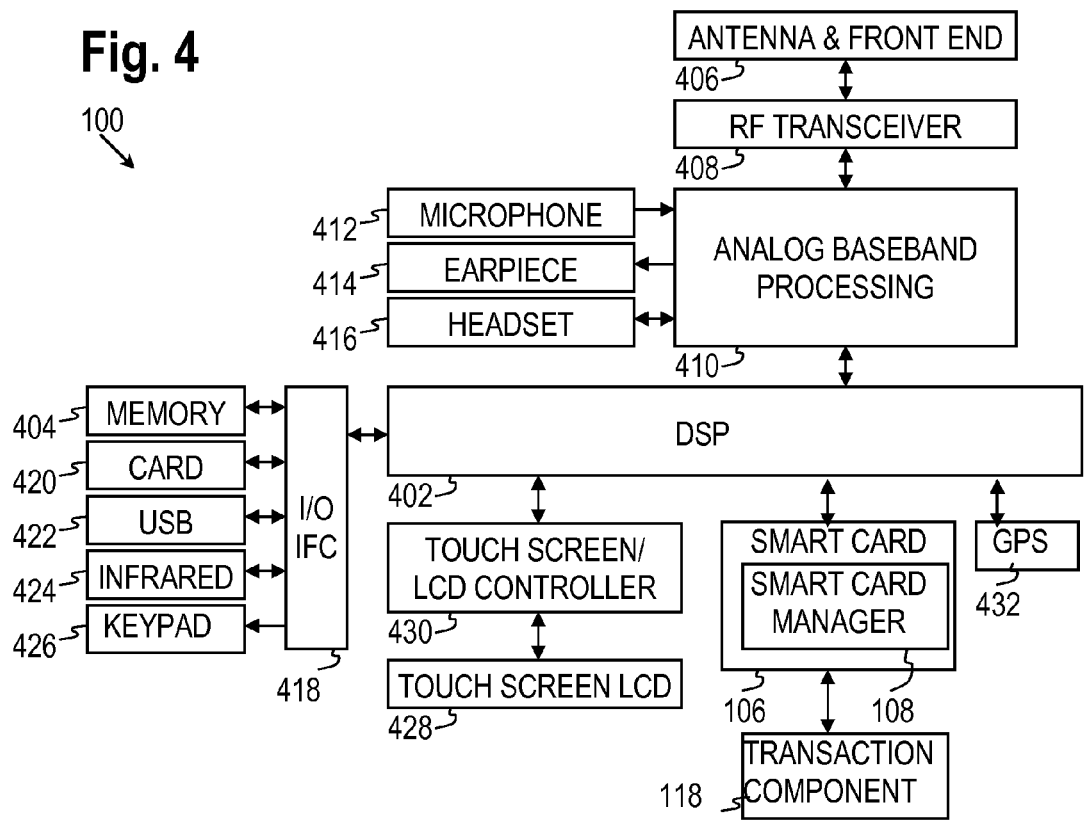
FIG. 4 shows a block diagram of an illustrative mobile device.

FIG. 4 shows a block diagram of the mobile device 100. The mobile device 100 includes a digital signal processor (DSP) 402 and a memory 404. As shown, the mobile device 100 may further include an antenna and front end unit 406, a radio frequency (RF) transceiver 408, an analog baseband processing unit 410, a microphone 412, an earpiece speaker 414, a headset port 416, an input/output interface 418, a memory card 420, a universal serial bus (USB) port 422, an infrared port 424, a keypad 426, a liquid crystal display (LCD) with a touch sensitive surface 428 or other display, a touch screen/LCD controller 430, a global positioning system (GPS) sensor 432, the smart card 106, the smart card manager 108 for the smart card 106, and the transaction component 118.

The DSP 402 or some other form of controller or central processing unit operates to control the various components of the mobile device 100 in accordance with embedded software or firmware stored in the memory 404. The memory 404 can be the same as the memory 126. In addition to the embedded software or firmware, the DSP 402 may execute other applications stored in the memory 404 or made available via information carrier media such as portable data storage media like the memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the mobile device 100 to send and receive information from a cellular network or some other available wireless communications network. The RF transceiver 408 provides frequency shifting, e.g., converting received RF signals to baseband and converting baseband transmit signals to RF. The analog baseband processing unit 410 may provide channel equalization and signal demodulation to extract information from received signals, may modulate information to create transmit signals, and may provide analog filtering for audio signals. To that end, the analog baseband processing unit 410 may have ports for connecting to the built-in microphone 412 and the earpiece speaker 414 that enable the mobile device 100 to be used as a cell phone.

The DSP 402 may send and receive digital communications with a wireless network via the analog baseband processing unit 410. In some embodiments, these digital communications may provide connectivity to the application provider server 122, enabling the mobile device 100 to load smart card applications. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The infrared port 424 and other optional ports such as a Bluetooth interface or an IEEE 802.11 compliant wireless interface may enable the mobile device 100 to function as a smart card, communicating wirelessly with other nearby mobile devices and/or wireless base stations. In some contemplated systems, the mobile device 100 is able to wirelessly exchange information at a point-of-sale when placed near a suitable transceiver, such as the card reader 120.

The keypad 426 couples to the DSP 402 via the I/O interface 418 to provide one mechanism for the user to make selections, enter information, and otherwise provide input to the mobile device 100. Another input mechanism may be the touch screen display 428, which may also display text and/or graphics to the user. The display controller 430 couples the DSP 402 to the touch screen display 428. The GPS sensor 432 is coupled to the DSP 402 to decode global positioning system signals, thereby enabling the mobile device 100 to determine its position.

Figure 5:
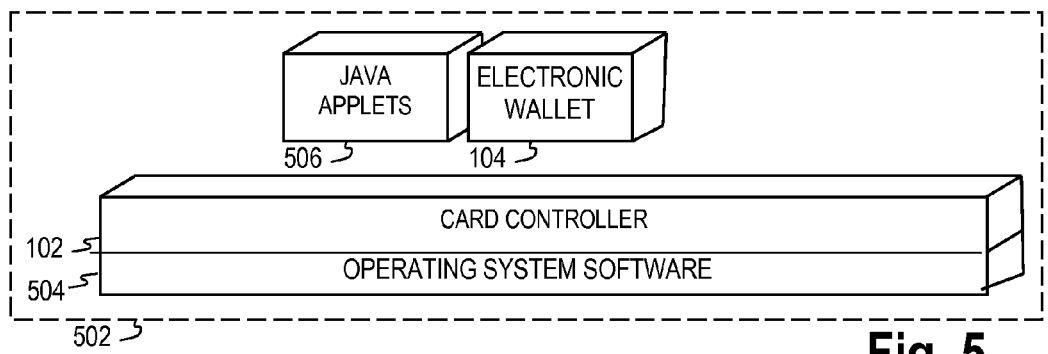
FIG. 5 shows a block diagram of an illustrative software configuration for a mobile device according to some embodiments of the present disclosure.

FIG. 5 illustrates a software environment 502 that may be implemented by the DSP 402. The DSP 402 executes operating system software 504 that provides a platform from which the rest of the software operates. The operating system software 504 provides drivers for the mobile device hardware with standardized interfaces that are accessible to application software. The operating system software 504 may transfer control between applications running on the mobile device 100. Also shown in FIG. 5 are the card controller 102, JAVA applets 506, and the electronic wallet 104. The JAVA applets 506 may configure the mobile device 100 to browse the web, play music, play games, and provide utilities and other functionality.

The system described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein, such as the application provider server 122. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor may be implemented as one or more CPU chips.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 692 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for selectively loading smart card applications to a smart card in an electronic wallet on a mobile device comprising:
   a mobile device comprising an electronic wallet and a smart card, the smart card including a resident smart card application,
   wherein the mobile device is configured to authenticate a request to load a selected smart card application to the smart card and to provide loading approval,
   wherein the mobile device is further configured to determine whether the smart card has sufficient memory for the selected smart card application, and
   wherein in response to a determination that the smart card memory does not have sufficient memory for the selected smart card application, the mobile device is further configured to remove at least some information for the resident smart card application from the smart card, to load a proxy, which requires a smaller memory on the smart card than the at least some information for the resident smart card application being removed and facilitates re-loading the resident smart card application to the smart card in the future, to the smart card as a placeholder for the resident smart card application, and to load the selected smart card application to the smart card in response to the loading approval and loading of the proxy.

2. The system of claim 1, wherein the electronic wallet is configured to use a set of rules to select the selected smart card application for a transaction.

3. The system of claim 1, wherein the electronic wallet is configured to select several smart card applications based on processing a set of rules, and wherein a user selects one of the several smart card applications for the transaction via a list of the several smart card applications selected by the electronic wallet presented by a user interface.

4. The system of claim 1, wherein the mobile device further comprises:
   a user interface to select the selected smart card application for a transaction.

5. The system of claim 1, wherein the mobile device is further configured to determine whether the selected smart card application is on the smart card and to determine whether the smart card has sufficient memory for the selected smart card application in response to a determination that the selected smart card application is not on the smart card.

6. The system of claim 1, wherein the mobile device is further configured to save the resident smart card application to at least one of the mobile device and a server.

7. The system of claim 1, wherein the mobile device is further configured to encrypt the at least some information for the resident smart card application and store the encrypted information on a memory of the mobile device.

8. The system of claim 1, wherein the mobile device is further configured to encrypt the resident smart card application.

9. The system of claim 1, wherein the proxy is configured to facilitate re-loading the resident smart card application to the smart card in the future by replacing the resident smart card application and retaining an application identifier used for the resident smart card application.

10. The system of claim 1, wherein the selected smart card application is on at least one of a server and the mobile device.

11. The system of claim 1 further comprising a server configured to use a digital certificate to authenticate the request from the mobile device.

12. The system of claim 1, wherein the selected smart card application resides in at least one of the mobile device and a server.

13. The system of claim 1, wherein the mobile device is further configured to use a digital certificate to promote replacing the resident smart card application with the proxy.

14. The system of claim 1, wherein the mobile device is further configured to use a digital certificate to promote loading the selected smart card application to the smart card.

15. The system of claim 1 further comprising a card reader to communicate with the resident smart card application via contact-less communication for the transaction, wherein the communication is further defined as a radio frequency communication.

16. The system of claim 1, wherein the at least some information for the resident smart card application comprises at least one of the resident smart card application, an account number for the resident smart card application, an account limit for the resident smart card application, and an account balance for the resident smart card application.

17. A method for selectively loading smart card applications to a smart card in an electronic wallet on a mobile device comprising:
   authenticating a request to load a selected smart card application to a smart card on the mobile device;
   providing loading approval;
   determining, by a mobile device, whether the smart card has sufficient memory for the selected smart card application;
   removing, by the mobile device, at least some information for the resident smart card application from the smart card in response to a determination that the smart card memory does not have sufficient memory for the selected smart card application;
   loading, by the mobile device, a proxy to the smart card as a placeholder for the resident smart card application, wherein the proxy requires a smaller memory on the smart card than the at least some information for the resident smart card application being removed and facilitates re-loading the resident smart card application to the smart card in the future; and
   loading, by the mobile device, the selected smart card application to the smart card in response to the loading approval and loading the proxy.

18. The method of claim 17 further comprising saving, by the mobile device, the at least some of the information for the resident smart card application to at least one of a memory on the mobile device and a server.

19. A system for selectively loading smart card applications to a smart card in an electronic wallet on a mobile device comprising:
   a mobile device comprising an electronic wallet and a smart card, the smart card including a resident smart card application; and
   a server configured to authenticate a request from the mobile device to load a selected smart card application and to provide loading approval to the mobile device,
   wherein the mobile device is configured to determine whether the smart card has sufficient memory for the selected smart card application, and
   wherein in response to a determination that the smart card memory does not have sufficient memory for the selected smart card application, the mobile device is further configured to remove at least some information for the resident smart card application from the smart card, to load a proxy, which requires a smaller memory on the smart card than the at least some information for the resident smart card application being removed and facilitates re-loading the resident smart card application to the smart card in the future, to the smart card as a placeholder for the resident smart card application, and to load the selected smart card application to the smart card in response to the loading approval and loading of the proxy.

20. The system of claim 19, wherein the resident smart card application is at least one of a transit card, a loyalty card, an identification card, a credit card, a coupon card, a security card, an access card, a debit card, and a rewards card.

* * * * *